United States Patent [19]
McGuire

[11] Patent Number: 5,540,549
[45] Date of Patent: Jul. 30, 1996

[54] FLUID DAMPING DEVICES

[75] Inventor: Dennis P. McGuire, Erie, Pa.

[73] Assignee: Lord Corporation, Cary, N.C.

[21] Appl. No.: 286,847

[22] Filed: Aug. 5, 1994

[51] Int. Cl.$^6$ ...................... B64C 11/04
[52] U.S. Cl. .................. 416/140; 267/140.13; 267/219
[58] Field of Search ................ 416/106, 134 A, 416/140; 267/140.13, 219

[56] References Cited

U.S. PATENT DOCUMENTS

| | | | |
|---|---|---|---|
| 2,919,883 | 1/1960 | Murphy | 248/358 |
| 3,107,752 | 10/1963 | McLean | 188/87 |
| 3,141,523 | 7/1964 | Dickie | 188/1 |
| 3,154,273 | 10/1964 | Paulsen | 248/22 |
| 3,167,157 | 1/1965 | Thorn | 188/98 |
| 3,368,807 | 2/1968 | Thrasher | 267/35 |
| 3,758,230 | 9/1973 | Potter | 416/107 |
| 3,874,646 | 4/1975 | Vernier | 267/136 |
| 3,888,449 | 6/1975 | Jablonski et al. | 248/358 R |
| 3,920,231 | 11/1975 | Harrison et al. | 267/35 |
| 4,105,365 | 8/1978 | Ferris et al. | 416/107 |
| 4,236,607 | 12/1980 | Hawles et al. | 188/1 B |
| 4,566,677 | 1/1986 | LePierres | 267/140.1 |
| 4,607,828 | 8/1986 | Bodin et al. | 267/140.1 |
| 4,741,520 | 5/1988 | Ballamy et al. | 267/140.1 |
| 4,770,396 | 9/1988 | Jouade | 267/140.1 |
| 4,778,343 | 10/1988 | Hahn et al. | 416/134 A |
| 4,779,585 | 10/1988 | Behrens et al. | 123/192 R |
| 4,790,521 | 12/1988 | Ide et al. | 267/219 |
| 4,811,919 | 3/1989 | Jones | 244/54 |
| 4,817,926 | 4/1989 | Schwerdt | 267/140.1 |
| 4,893,988 | 1/1990 | Sato | 416/160 |
| 4,927,122 | 5/1990 | Brumme et al. | 267/140.1 |
| 5,092,738 | 3/1992 | Byrnes et al. | 416/134 A |
| 5,116,201 | 5/1992 | Fradenburgh et al. | 416/140 |
| 5,143,358 | 9/1992 | Hibi et al. | 267/140.13 |
| 5,209,460 | 5/1993 | Bouhours et al. | 267/140.13 |
| 5,251,883 | 10/1993 | Simon et al. | 267/136 |
| 5,266,005 | 11/1992 | Aubry | 416/98 |
| 5,316,442 | 5/1994 | Moville | 416/140 |
| 5,374,039 | 12/1994 | Schmidt et al. | 267/140.13 |
| 5,388,812 | 2/1995 | Kojima et al. | 267/140.13 |
| 5,407,325 | 4/1995 | Aubry | 416/103 |

FOREIGN PATENT DOCUMENTS

| | | | |
|---|---|---|---|
| 0559506 | 9/1993 | European Pat. Off. | 267/140.13 |
| 3522333 | 1/1987 | Germany | 267/140.13 |
| 1119832 | 6/1986 | Japan | 267/140.13 |
| 5215176 | 8/1993 | Japan | 267/140.13 |

*Primary Examiner*—Edward K. Look
*Assistant Examiner*—Mark Sgantzos
*Attorney, Agent, or Firm*—Richard K. Thomson; Randall S. Wayland

[57] ABSTRACT

The invention relates to a fluid device for providing high load carrying capacity in an one direction and which provides a high level of damping along a substantially perpendicular direction. This is achieved by a device which includes an inner member and an outer member and a flexible section causing a connection therebetween, said flexible section exhibiting a substantially higher stiffness along one axis, a fluid cavity formed within said device, a piston attached to one of said inner member and said outer member, said piston being substantially surrounded by, and submersed in said fluid. In one embodiment, the piston includes a piston area $A_p$ which is substantially greater than ½ the fluid cavity area $A_c$. Movement of the piston within the fluid cavity causes a damping force comprising a throttling component as well as a viscous shear component. Means are disclosed for substantially increasing the viscous shear component and throttling component including novel piston concepts. This invention has particular utility for use in hingeless rotor systems for helicopters.

14 Claims, 4 Drawing Sheets

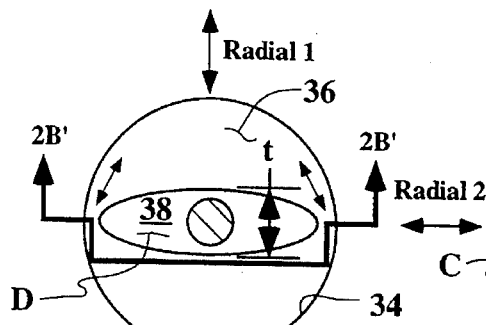
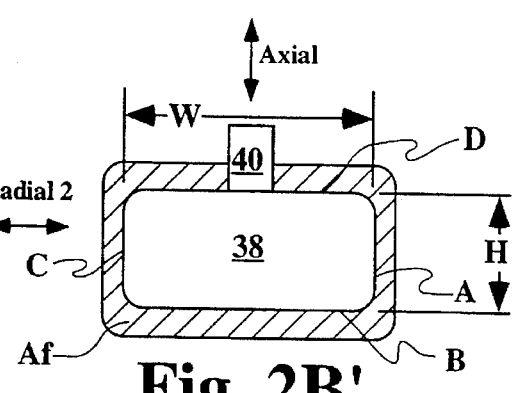
Fig. 2B     Fig. 2B'
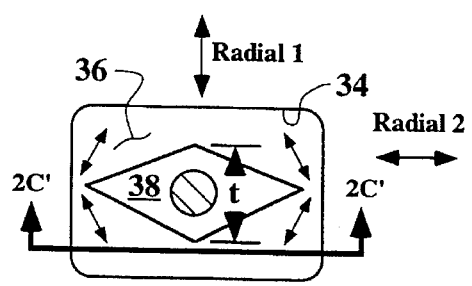
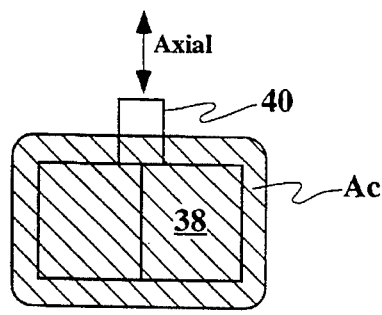
Fig. 2C     Fig. 2C'
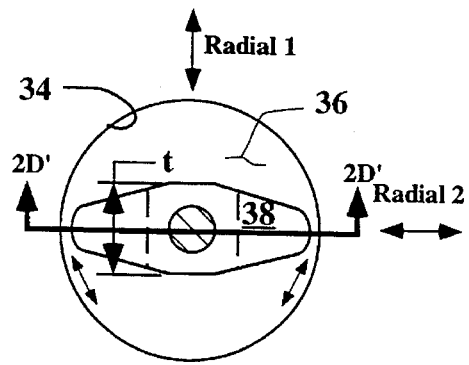
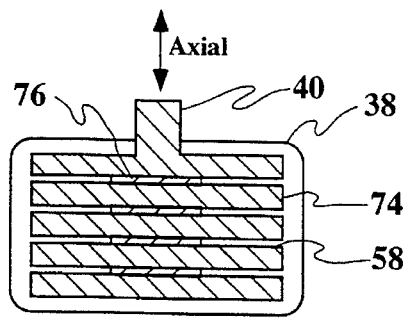
Fig. 2D     Fig. 2D'
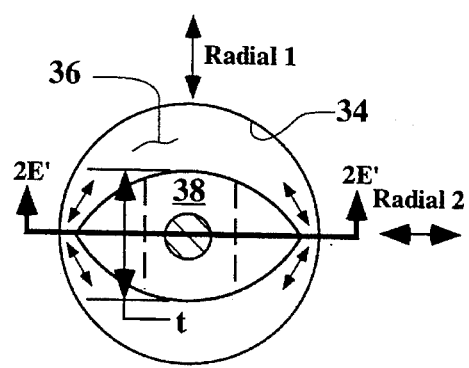
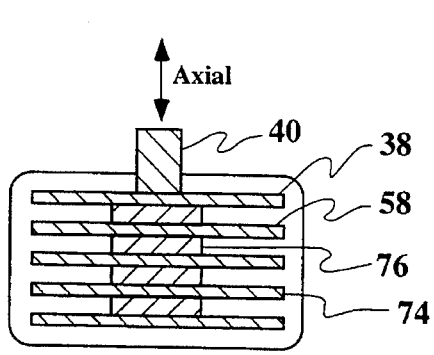
Fig. 2E     Fig. 2E'

FLUID DAMPING DEVICES

FIELD OF THE INVENTION

This invention relates to the area of fluid devices. Specifically, the invention relates to the area of fluid mountings and dampers for supporting static loads and providing vibration damping to vibrating components and the like.

BACKGROUND OF THE INVENTION

Damping of mechanical vibrations, as opposed to isolation of vibrations, may be desirable in some applications to reduce dynamic motions. Usually, damping is required in systems that are load controlled, where loads applied to the system cause dynamic oscillatory motions. Adding large amounts of hysteretic damping to these systems can reduce these resultant motions. One application where high damping may be required is in the so-called hingeless or flexbeam rotor system of a rotary wing aircraft, i.e., a helicopter. Typically, these composite rotor systems do not exhibit enough internal damping to damp lead-lag motions. As such, a lead-lag damper may be required to provide supplemental damping to the system. Prior art systems have greatly increased system damping by addition of passive dampers with the resulting reduction in rotor blade lead-lag motions.

One such passive elastomeric damper is taught in U.S. Pat. No. 4,778,343 to Hahn et al., the disclosure of which is hereby incorporated by reference herein. The Hahn '343 patent describes a system which utilizes dual elastomer dampers 9 to damp lead-lag motions. At the same time, these dampers also react to flapping loads. The dampers 9 are generally used in opposed pairs, one on the top of the torque tube and one to the bottom thereof. These passive dampers 9 are bonded in highly damped polymers (loss factors of 0.5 or more). The highly damped material hysteretically damps the motion of the blades by converting motion into heat.

U.S. Pat. No. 5,092,738 to Byrnes et al. which is hereby incorporated by reference herein, describes another passive damper system for a hingeless or flexbeam rotor system. The Byrnes et al. '738 patent teaches using a spherical elastomeric bearing 52 to perform a centering function, accommodate torsional and cocking motions, and react to the flapping loads. U.S. Pat. No. 4,893,988 to Sato teaches yet another passive damper system. A lead-lag damper for a more conventional helicopter rotor system is described in the commonly assigned U.S. Pat. No. 3,758,230 to Potter.

As an improvement over passive elastomer dampers, damper devices have been developed by the assignee of the present invention which utilize combinations of fluid and elastomer to increase damping levels and linearity achievable by passive elastomer dampers. The commonly assigned and copending U.S. application Ser. No. 07/934,402, which is incorporated by reference herein, describes a fluid and elastomer damper for use on an articulated rotor system. The device described in the abovementioned '402 application utilizes a fluid contained within the damper which is throttled back and forth between opposed chambers and through a fluid passageway and to create additional damping over and above what is available by elastomeric dampers (hysteresis) alone. These dampers will be referred to as throttled-type dampers. The device further includes means for limiting the dynamic pressure buildup in the damper.

These throttled-type dampers produce fluid damping in addition to the hysteretic damping which varies as a square of the velocity of the fluid flow taking place within the fluid passageway. However, although these throttled-type dampers provide excellent properties, a simpler construction may be needed in some applications. Furthermore, providing two fluid cavities can take up space envelope that may not be available in some applications. This is especially true in helicopter rotor applications where any increase in size of the damper will mean more exposure to the air stream, and thus, a dramatic increase in the drag on the rotor blade system. In addition, without proper sizing of the passages and viscosity, throttled-type dampers tend to be somewhat nonlinear. A fluid and elastomer damper for a more conventional helicopter rotor system is described in U.S. Pat. No. 4,566,677 to LePierres.

The prior art teaches of devices which utilize an inner member for moving through a fluid, as opposed to throttling, to provide additional nonhysteretic damping. U.S. Pat. Nos. 3,874,646 to Vernier, 3,154,273 to Paulsen, and 3,141,523 to Dickie, describe devices whereby a piston is used in a closed cavity which includes a viscous material. Movement of the piston within the cavity causes a stirring of the fluid, thus increasing damping over and above that available from the elastomer alone. However, these types of devices lack the ability of providing very high damping forces and at the same time exhibiting the ability to carry large loads. Further, the damping forces available have not been optimized.

U.S. Pat. No. 4,790,521 to Ide et al., which is hereby incorporated by reference herein, describes a fluid mounting including a resistance plate member 10 to stir a viscous fluid 11 causing a resistance force. The Ide at al. '521 device, however, lacks the capability of carrying high axial or radial loads. Further, the resistance plate member 10 does not act at the most advantageous point within the mounting. Near the base of the resistance plate member there is no relative movement between it and the fluid, therefore no damping is created. Further yet, the use of the viscous shear component is inefficient.

U.S. Pat. Nos. 4,927,122 to Brumme et al., 4,817,926 to Schwerdt, 4,811,919 to Jones, 4,779,585 to Behrens et al., 4,770,396 to Jouade, 4,741,520 to Bellamy et al., 4,607,828 to Bodin et al., 4,236,607 to Halwes et al., 3,888,449 to Jablonski et al., 3,167,157 to Thorn, 3,107,752 to McLean, and 2,919,883 to Murphy, disclose various piston designs and concepts.

SUMMARY OF THE INVENTION

Therefore, given the benefits and drawbacks of the prior fluid damping devices, the present invention provides a fluid damping device, which may be used on a hingeless helicopter rotor system, which provides high load carrying capacity in a first direction while providing high damping in a second direction perpendicular to said first direction. The present invention provides the high damping force by moving a piston through a fluid cavity filled with a fluid. The piston is substantially completely submersed in and surrounded by the fluid. As the piston is moved through the fluid, a viscous drag component and a throttling component are developed. These components are enhanced by making the piston area $A_p$ substantially greater than ½ of the cavity area $A_c$. Further, the shear area $A_s$ is substantially increased by supplying a plurality of slots in the piston which act to expose more area to the fluid in the direction of high damping. The damping achievable with this device is substantially increased by placement of the piston at the point of maximum motion.

The present invention provides a fluid device comprising an inner member for interconnection to a first moving member, an outer member for interconnection to a second moving member, an flexible section forming a flexible interconnection between said inner member and said outer member. The flexible section exhibits a high stiffness in a first direction which is substantially greater than a low stiffness in a second direction that is substantially perpendicular to said first direction. A fluid cavity is formed in said fluid device which is substantially filled by fluid, said fluid cavity having a cavity area $A_c$. A piston is interconnected to one of said inner member and said outer member and housed within said fluid cavity, said piston having a piston area $A_p$ and a surface area As, said piston being substantially surrounded by said fluid and moving within said fluid cavity as a result of relative movement between said inner member and said outer member causing said fluid to flow about said piston and through a flow area $A_f$, where $A_f = A_c - A_p$. The movement causes a damping force to be exerted on said piston by said fluid, said damping force acting substantially along said second direction, said damping force being made up of a throttling component from said fluid flowing through said flow area $A_f$ and a viscous drag component developed from said fluid acting on said surface area $A_s$.

It is another feature to provide a fluid damper for a helicopter rotor system, comprising: an inner member for interconnecting to a flexbeam of said helicopter rotor system; an outer member for interconnecting to a torque tube of said helicopter rotor system. A flexible section is attached between said inner member and said outer member, said flexible section exhibiting an axial stiffness for reacting flap loads and a radial stiffness for reacting lead-lag loads, said axial stiffness being substantially greater than said radial stiffness. A fluid cavity is formed in said fluid damper and contains a fluid which substantially fills said fluid cavity. A piston is interconnected to one of said inner member and said outer member, said piston being housed within said fluid cavity and substantially completely surrounded by said fluid and moving within said fluid cavity in a radial direction as a result of lead-lag motions within said helicopter rotor system. As a result of relative movement between said inner member and said outer member, said fluid flows about said piston and causes a damping force to be exerted on said piston by said fluid.

It is another feature to provide a fluid mounting for attachment of an engine to a support structure, comprising: an inner member for interconnection to a first moving member; an outer member for interconnection to a second moving member; an elastomeric section causing a flexible connection between said inner member and said outer member, said elastomeric section including a radial stiffness and an axial stiffness, one of said axial stiffness and said radial stiffness being substantially greater than the other of said axial stiffness and said radial stiffness. A fluid cavity having an area $A_c$ is formed within said fluid mounting and contains a fluid which substantially fills said fluid cavity A piston is interconnected to one of said inner member and said outer member and housed within said fluid cavity. Said piston has a piston area $A_p$ and a surface area $A_s$, and is substantially completely surrounded by said fluid moving within said fluid cavity as a result of relative movement between said inner member and said outer member causing said fluid to flow about said piston and through a flow area $A_f$, where $A_f = A_c - A_p$. The movement further causes a damping force to be exerted on said piston by said fluid, said damping force being made up of a throttling component from said flow through said flow area $A_f$ and a viscous drag component from said fluid acting on said surface area $A_s$.

It is an advantage of the present invention that large loads may be carried in one direction and large damping values may be obtained in a perpendicular direction. Further, large damping forces can be developed in a smaller envelope size than throttled-type dampers utilizing multiple chambers. Still further, the viscous shear component can be dramatically increased thus providing a highly linear damper performance.

It is an advantage of the present invention that it may be utilized for a hingeless rotor system and reduce the overall size of the damper which results in reduced the exposure of the damper to the air stream. Additionallty, it may be used for mounting an engine and the like and provide large amounts of damping in at least one radial direction while also provide high load carrying capacity in a perpendicular direction.

The abovementioned and further aspects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

FIG. 2A' is a schematic showing a piston and cavity construction and illustrating the piston area $A_p$ (shown cross-sectioned);

FIG. 2B is a schematic showing an oblong or oval-shaped piston and round cavity construction;

FIG. 2B' is a schematic showing a piston and cavity construction and illustrating the flow area $A_f$;

FIG. 2C is a schematic showing diamond-shaped piston and rectangular cavity construction;

FIG. 2C' is a schematic showing a piston and cavity construction and illustrating the cavity area $A_c$;

FIG. 2D is a schematic showing a tapered piston with rounded ends and round cavity construction;

FIG. 2D' is a schematic showing a piston and cavity construction and illustrating a slotted piston where the slots are thinner than the plates;

FIG. 2E is a schematic showing a football-shaped piston and round cavity construction;

FIG. 2E' is a schematic showing a slotted piston where the plates are thinner than the slots;

DETAILED DESCRIPTION OF THE INVENTION

Figures 1, 2A:
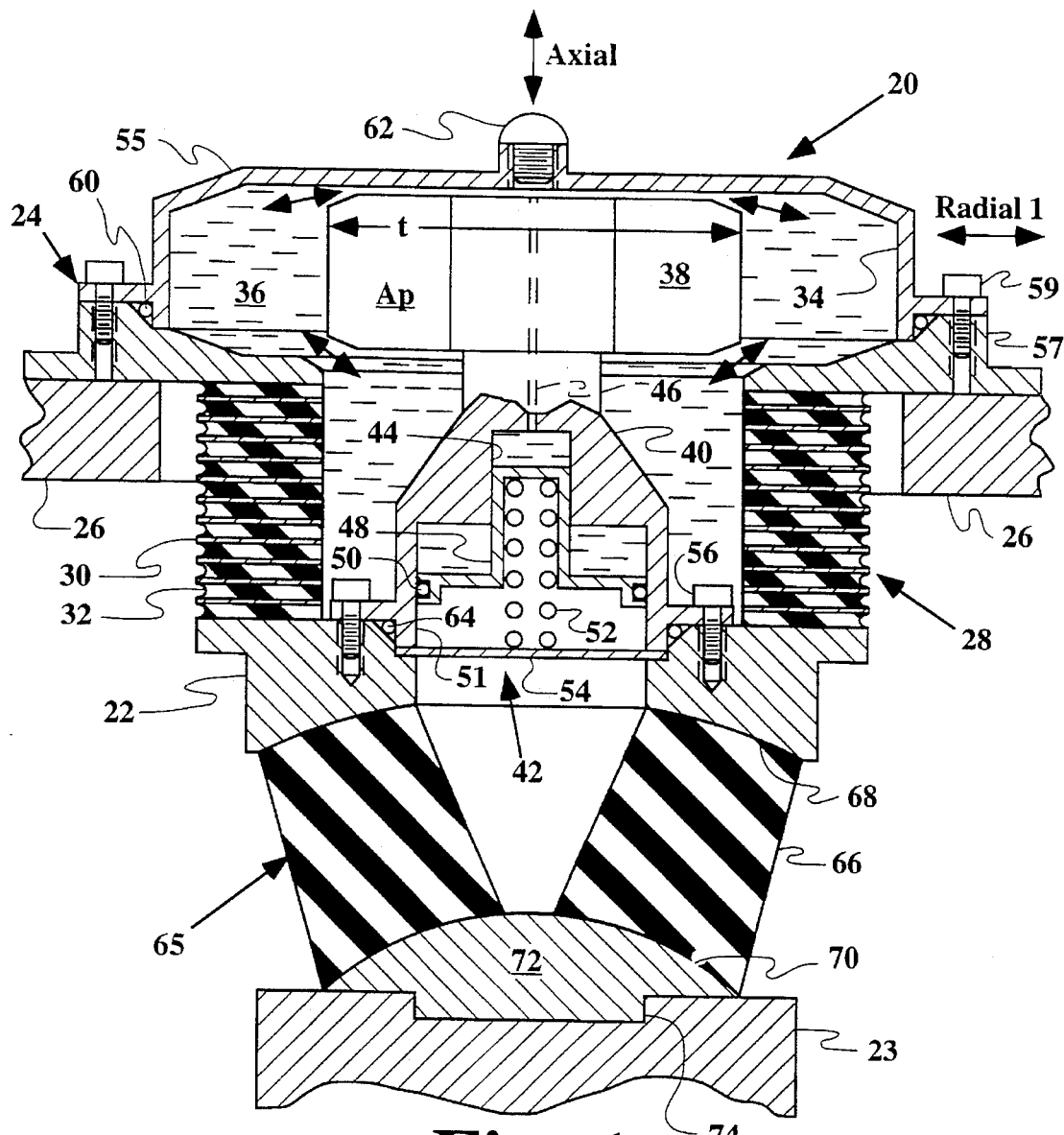
FIG. 1 is a partially sectioned side view of the present invention fluid device shown in a hingeless helicopter rotor system environment.
FIG. 2A is a schematic showing a hammerhead-shaped piston and round cavity construction.

With reference to the various figures wherein like reference characters are employed where possible to indicate like parts, there is shown in FIG. 1 a fluid device 20, in this case a damper for a composite hingeless or flexbeam helicopter rotor system, which includes an inner member 22 for interconnection to a first moving member 23, outer member 24 for interconnection to a second moving member 26, and a flexible section 28 which is preferably constructed of laminated shim and elastomer construction. By the term interconnection, it is meant that the attachment of members 22 and 24 to first and second members 23 and 26 can be made directly and mechanically or they can be attached through an intermediate member such as bearing 65.

The flexible section 28 forms a flexible interconnection between the inner member 22 and outer member 24 and exhibits a high spring rate in a first direction which is substantially greater than a low spring rate in second direction which is substantially perpendicular to said first direction. The flexible interconnection allows loads to be carried between the members 22 and 24 in the axial and radial directions. In this embodiment, an axial spring rate or stiffness is substantially greater than a stiffness along a radial direction, in this case the Radial 1 direction. By the term substantially greater, it is meant that the higher stiffness is about 10 times or more as stiff as in the perpendicular direction.

By way of example and not by limitation, the spring rate of the fluid device 20 described herein is K radial=800 lb/in and K axial=25,000 lb/in. By the term substantially perpendicular it is meant that the axes of the first and second directions be aligned within an angle of between approximately 60 degrees and 120 degrees.

The laminated shim and elastomer construction includes alternating layers of shims 30 and elastomer 32. Because of the inherent incompressibility of elastomers that are constrained, adding shims 30 in a laminated configuration will substantially increase the axial stiffness, while only changing the shear stiffness by a modest amount. The elastomer 32 used can be natural rubber, synthetic rubber, a blend of natural and synthetic rubbers, silicone rubber, or the like. Further, the flexible section 28 is preferably integrally bonded to the inner member 22 and outer member 24 by processes known to those skilled in the art. The flexible element 28 could also be a metal bellows element or other like device which can provide the appropriate spring rates and seal the device 20. The shims 30 can be aluminum, brass, steel, plastic, composite, or other suitable material.

A fluid cavity 34 is formed integrally within the fluid device 20. The fluid cavity 34 is usually formed by the flexible section 28, the inner member 22 and the outer member 24 acting to define it. Ideally, the fluid cavity 34 will be round in cross-section, although it can be rectangular, oblong, or the like. In this embodiment, the working section of the fluid cavity 34 is housed at a portion of the device 20 located outboard of the elastomer section 28. The fluid cavity 34 is offset from the elastomer section 28 and at a location where any movement of the piston 38 will be at a maximum. This allows the piston 38 to move within the fluid cavity 34 the same distance as the total amount of the relative movement between the inner member 22 and the outer member 24. This generates the highest damping forces. Prior art systems used plate-like structures which mix or stir the fluid, but a large portion of the plate-like member is largely ineffective as there is no relative movement, and thus no fluid movement, at the base where the plate-like member attaches to the inner member.

A fluid 36, which is preferably viscous, is contained within and substantially fills the fluid cavity 34. Silicone fluids, and the like having a viscosity in the range of between 10,000 and 100,000 centistokes are acceptable. Ideally, a fluid having a viscosity of about 60,000 centistokes is preferred for the device 20. The fluid cavity 34 has a cavity area $A_c$ in the direction of maximum radial damping, in this case Radial 1.

The device 20, further includes a piston 38 which is interconnected to one of said inner member 22 and said outer member 24 and is housed within the fluid cavity 34. The piston 38 is substantially entirely submersed in, and surrounded by, the fluid 36.

In this embodiment, the direction of maximum damping is along the line Radial 1 as shown in FIG. 1. The piston 38 includes a piston area $A_p$ which is the piston area that is exposed in the radial direction of interest, i.e., in the Radial 1 direction where maximum damping is required. The piston area $A_p$ of piston 38 generally defines the amount of fluid 36 that is displaced as inner member 22 moves relative to outer member 24. The amount of fluid throttling that takes place is determined by the cavity area $A_c$ and also the thickness t of the piston at various points along its width W (FIG. 2A). In general, however, the flow area $A_f$ is approximately equal to:

$$A_f = A_c - A_p$$

In order to maximize the amount of throttling, the ratio of $A_p/A_c$ should be as close to 1 as possible yet still be able to accommodate the motions in the axial and radial directions. Preferable ranges of $A_p/A_c$ are from about 0.75 to 0.95. Movement of the piston 38 through the fluid 36 causes fluid 36 to flow about the piston 38 and through the flow area $A_f$. This causes a damping force to be exerted on the piston 38 by the fluid 36. In this invention, the damping force will act substantially along the predetermined direction, in this case the Radial 1 direction.

The damping force will be made up of a throttling component from the flow though area $A_f$ and a viscous drag component from the fluid 36 flowing over the surface area $A_s$ of the piston 38. The shape of the piston 38 in the present invention distinguishes the art. In one preferred embodiment, the piston 38 will be wider in its center portion and include significant thickness t. The thickness t provides a significant viscous drag component. Furthermore, making the piston 38 narrower at the edges will force more fluid 36 through the throttled passages adjacent the ends of the piston denoted as C and D in FIG. 2A, thus increasing the throttling effect. The shape and thickness t of the piston 38 can be optimally adjusted to provide damping forces which are substantially linear with respect to motion applied. Changing the thickness and amount of taper on the piston 38 will force more throttling of the fluid around the ends. The throttling component can be further enhanced by making the piston area $A_p$ substantially greater than one half $A_c$ or:

$$A_p \gg \tfrac{1}{2} A_c$$

The piston 38 is preferably supported by a pedestal 40. Ideally, the pedestal will have a minimal cross-section. Furthermore, a volume compensator 42 may be required for some devices 20 if they are exposed to any amount of temperature fluctuation. The volume compensator 42 will compensate for, i.e., allow, volume expansion of the fluid 36 and eliminate undesirable pressure buildups within the device 20. A typical volume compensator 42 will include a chamber 44 which is filled with fluid 36. A fluid passageway 46 of small diameter will allow fluid communication with the fluid cavity 34, yet the passageway 46 is small enough and long enough to allow interaction only in a static fashion. The fluid passageway 46 will hydrodynamically lock up at higher frequencies, above about 1–2 Hz. The compensator 42 may also include a partition 48, and means for applying pressure to said partition 48. In this embodiment, a coil spring 52 is used as the means for applying static pressure to the fluid 36 in the device 20. Pressure may be required in some devices 20 to prevent cavitation of the fluid 36 while undergoing large transient motion conditions.

In this embodiment, a seal 50 is used to hermetically seal and prevent the fluid in chamber 44 from leaking into chamber 51. Chamber 51 is optional. Further, it may be exposed to atmospheric pressure via a passage to prevent pressure buildup. Other suitable means for providing a partition 48 may also be used such as a fabric reinforced rolling diaphragm, a rubber diaphragm, a flexible bellows, and other like elements. A plate 54 is utilized in this embodiment to support the spring 52. The pedestal 40 is attached to the inner member 22 by way of bolts 56 or other equivalent fastening means, such as press fit, glue, rivets, welding, etc. Additional seal 64 keeps fluid 36 from escaping between pedestal 40 and inner member 22. Moreover, the pedestal 40 could be attached to the outer member 24 as well.

A cover 55, which is part of the outer member 24 is fastened by bolts 59 to base plate 57 and is hermetically sealed by seal 60 such as the O-ring illustrated. Together base plate 57 and cover 55 make up the outer member 24. Fill cap 62 is used to close the fluid cavity 34 after filling the fluid cavity 34 with fluid 36. Preferably, the cavity 34 will be completely full of fluid 36, although some trapped air may be allowable, depending on the magnitude of the motions the device 20 is exposed to. In this embodiment, the fluid cavity 34 is, in substantial part, formed by the cover 55 and base plate 57 of the outer member 24. The fluid cavity 34 is preferably round in cross section.

This embodiment of FIG. 1 represents a fluid damper of a helicopter rotor system, and more specifically a hingeless rotor system. The device 20 is attached between, and forms an interconnection between, the first moving member 23, which is a composite flexbeam of the composite rotor system and the second moving member 26 which is a torque tube of the rotor system. The interconnection between the inner member 22 and the flexbeam 23 is caused by a bearing 65 which preferably includes a flexing member 66 which is in contact with said inner member 22 and said first moving member 23 at first face 68 and second face 70. Preferably, the flexing member is elastomeric and is bonded to faces 68 and 70. This bearing 65 accommodates at least one of torsional and cocking motions. It is envisioned that a non-elastomeric bearing could be used as well, such as fabric-lined bearing, ball bearing, or the like. Pilot 74 on member 72 keeps the bearing 65 in proper location relative to second moving member 23.

In this application, the bearing 65 allows cocking and/or rotational motion of the first moving member 23 relative to the inner member 22. Preferably, the bearing 65 is constructed of laminated elastomer and shim construction and is known to those in the art as a spherical bearing. In practical systems, there will be two dampers or devices 20 per blade. In one embodiment, the assembly is comprised of the device 20 and a bearing 65 and the assembly will be installed on one side of the first moving member 23, and another substantially identical assembly is installed opposed thereto on the opposite side of first moving member 23.

The flexible section 28 attached between the inner member 22 and outer member 24 will exhibit an axial spring rate or stiffness for reacting flapping loads and a radial stiffness for reacting lead-lag loads. Preferably the axial stiffness will be substantially greater than the radial stiffness. Motions due to lead-lag will cause the piston 38 to move within the cavity 34 along the Radial 1 direction. This causes a throttling component and viscous drag component to be exerted on said piston 38. The shape of the piston 38 is optimized to provide a maximum damping force in the predetermined radial direction.

FIG. 2A and 2A' illustrate top and side views, respectively, of the piston 38 and cavity 34. The direction of maximum damping is along the Radial 1 direction. The Radial 2 direction does not generally require high damping, and in fact, may be designed to allow maximum motion by exhibiting large clearances. As piston 38 moves within cavity 34 in the Radial 1 direction, fluid 36 flows through gaps formed by faces A—A', B—B', C—C', and D—D'. The proportion of flow through the various gaps will depend on the thickness t of the piston 38 along its width W. The embodiment of FIG. 2A and 2A' provides a damping force which is a combination of throttling resistance force, primarily through gaps A—A' and C—C' and viscous drag forces primarily on faces D and B. The thickness t of the piston 38 in the Radial 1 direction tapers from a maximum thickness at the center to a minimum near each of the ends or edges A and C. The thickest section being adjacent the center of the piston causes more fluid 36 to be throttled near the ends due to the increased resistance to flow across the wider faces D and B near the center of the piston 38.

The piston 38 is also preferably symmetrical on either side of the radial 2 axis such that damping motion is preferably equal in both directions. Notably, the damping level in the Radial 2 direction is preferably minimal. In general, these devices 20 would be designed to accommodate dynamic motion predominantly in the Radial 1 direction. The shape of piston 38 in FIG. 2A is known as a hammerhead shape. FIG. 2A' illustrates the piston area $A_p$ (shown cross-sectioned.) Ideally, the diameter of the pedestal 40 would be minimized.

FIG. 2B and 2B' illustrates a piston shape that is oval or oblong-shaped. This embodiment of piston 38 operates in a similar fashion to the FIG. 2A, 2A' embodiment. It also includes a taper along its width W and has a maximum thickness t at the center. Further, the piston 38 has substantially the same cross section along its height H. This is true of all the embodiments. FIG. 2B' illustrates the flow area $A_f$ (shown cross-sectioned).

FIG. 2C and 2C' illustrates a piston shape that has straight tapers and is diamond-shaped. This embodiment of piston 38 operates in a similar fashion to the FIG. 2A, 2A' embodiment. FIG. 2C' also illustrates the cavity area $A_c$ (shown cross-sectioned).

FIG. 2D and 2D' illustrates a piston shape that has straight tapers and rounded ends. This embodiment of piston 38 operates in a similar fashion as compared to the other embodiments. FIG. 2D' illustrates a piston 38 which includes multiple slots 58 that are thinner in dimension than the plates 74. The slots are formed by stacking plates 74 and spacers 76 where the spacers 76 are shorter and thinner than plates 74. Slots 58 substantially increase the surface area $A_s$ exposed to the fluid 36 along the Radial 1 direction. Ideally, the surface area $A_s$ will be substantially greater than the piston area $A_p$. This will ensure that a large portion of the damping force comes from the viscous shear or viscous drag component. In general, the viscous shear component is more linear than the throttling component. However, it may, as a matter of practicality be required to include throttling because high magnitude damping forces may not be obtainable from the viscous drag component alone.

FIG. 2E and 2E' illustrates a piston shape that is football-shaped. This embodiment of piston 38 operates in a similar fashion to the other embodiments. FIG. 2E' illustrates a piston 38 which includes slots 58 that are wider in dimension than the plates 74. Spacers 76 are thicker than the plates 74, but are still shorter than the plates 74. Adjusting the thickness of the plates 74 and spacers 76 will determine the percentage of damping that comes from viscous drag component and from the throttling component.

Figure 3:
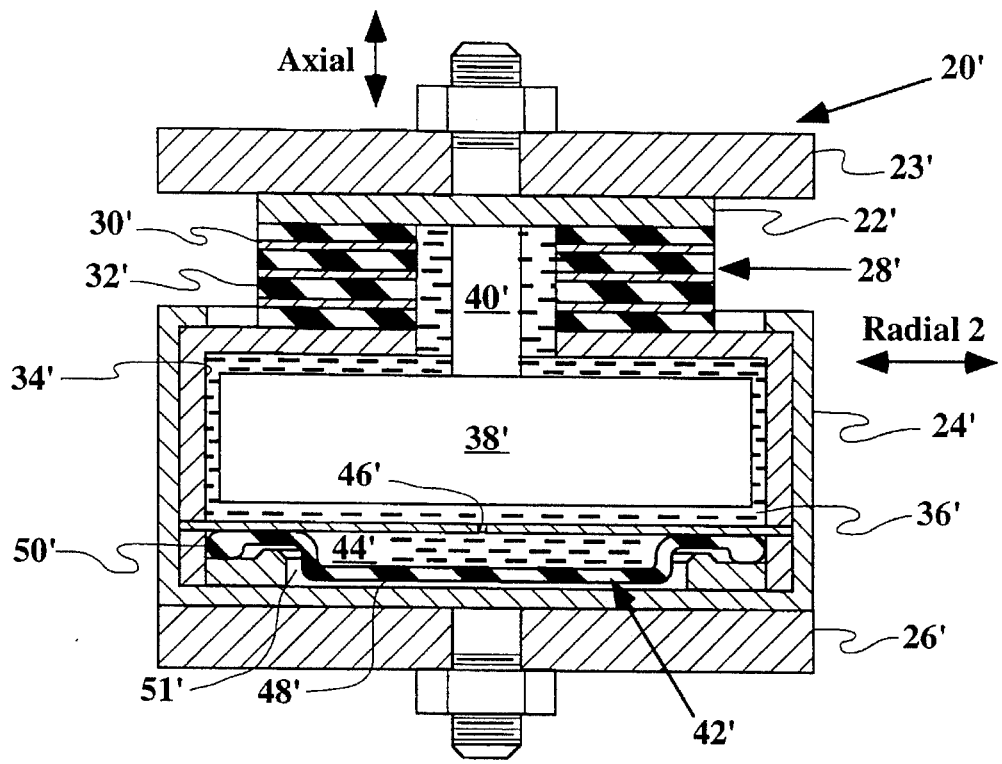
FIG. 3 is a fluid mounting with a stiff axial rate and soft radial rate which includes a volume compensator.

FIG. 3 illustrates a fluid mounting 20' for attaching an engine to a support structure including all the elements of the aforementioned damper. Again, in one aspect of the present invention, one of the axial and radial stiffness is substantially greater than the other. In this embodiment, the axial direction is the stiffest. Further, the high damping direction is the Radial 1 direction (into and out of the paper.) A partition 48' is formed by flexible diaphragm. Fluid passageway 46' acts as a passageway to a volume compensator 42'.

Figure 4:
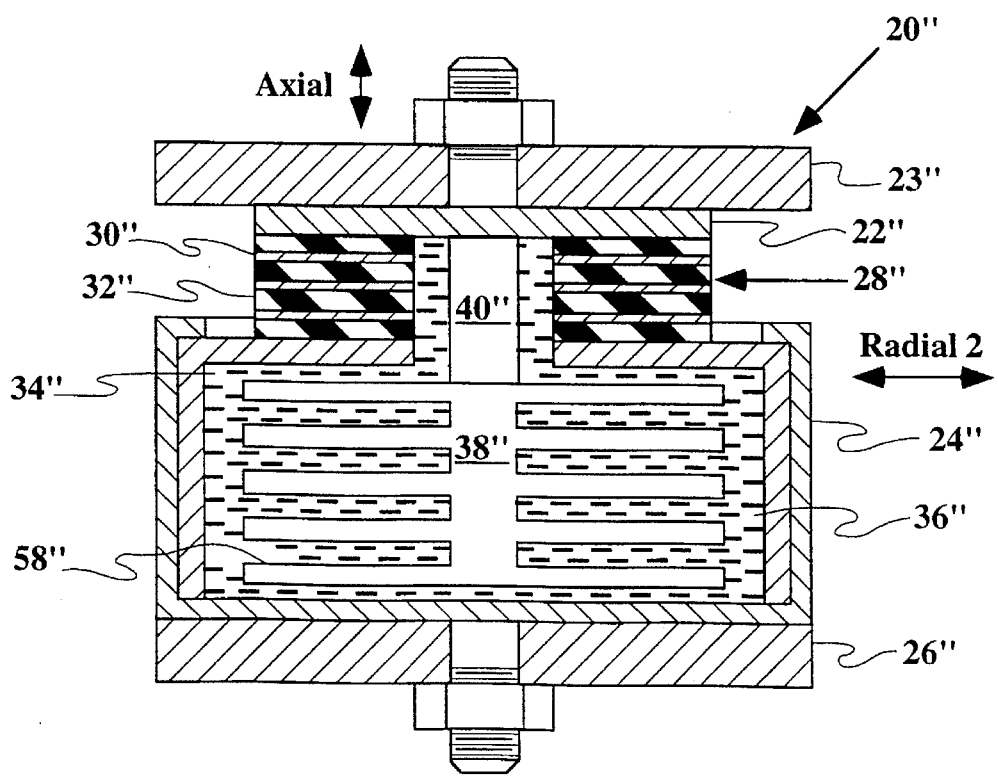
FIG. 4 is a fluid mounting with a stiff axial rate and a radially slotted one-piece piston.

FIG. 4 illustrates a fluid mounting 20" for attaching an engine to a support structure including all the elements of the aforementioned FIG. 3 embodiment, except, it lacks the volume compensator 42'. The slotted piston 38" causes high damping in the Radial 1 direction (into and out of the paper.) This embodiment would have a extremely high axial stiffness due to being full of fluid. The substantially incompressible fluid column will restrain axial motion.

Figure 5:
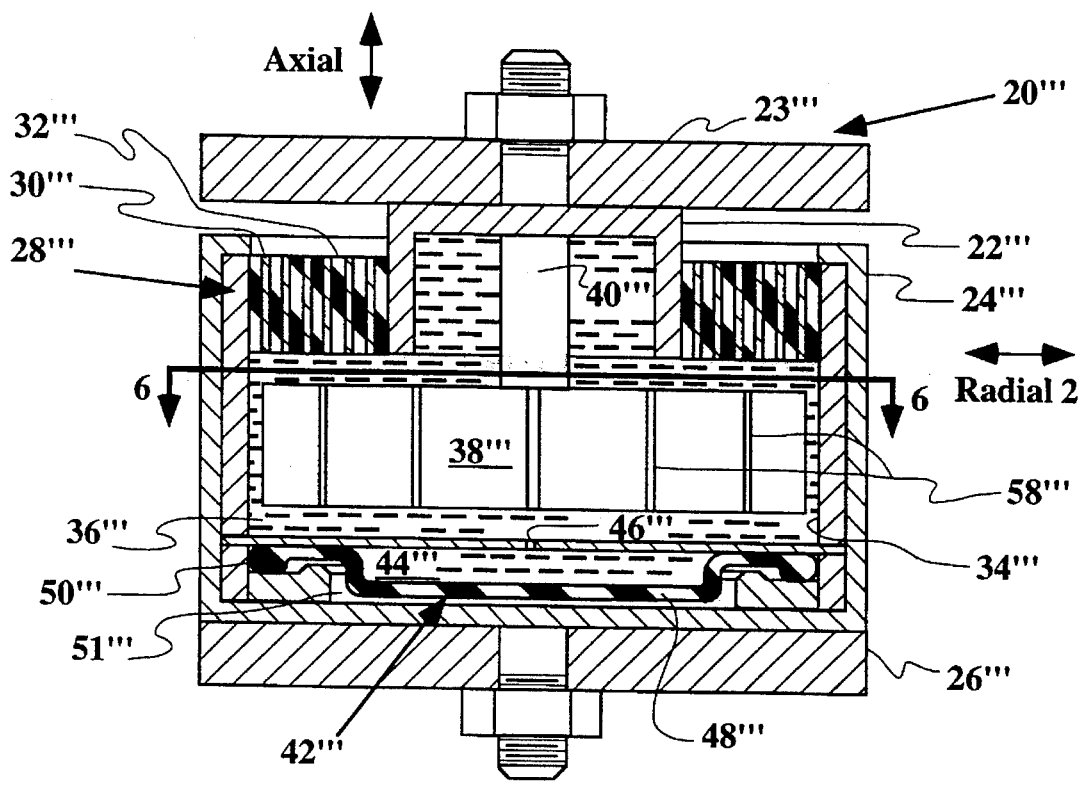
FIG. 5 is a fluid mounting with a stiff radial rate and soft axial rate including a volume compensator and an axially slotted one-piece piston.

FIG. 5 illustrates a fluid mounting 20''' for attaching an engine to a support structure including all the elements of the aforementioned FIG. 3 embodiment, except, the mounting exhibits a high radial stiffness and a low axial stiffness. The slotted piston 38''' is disk-shaped and causes high damping in the Axial direction. This embodiment also includes a fluid passageway 46''' which can act as a passageway to a compensator 48'''.

Figure 6:
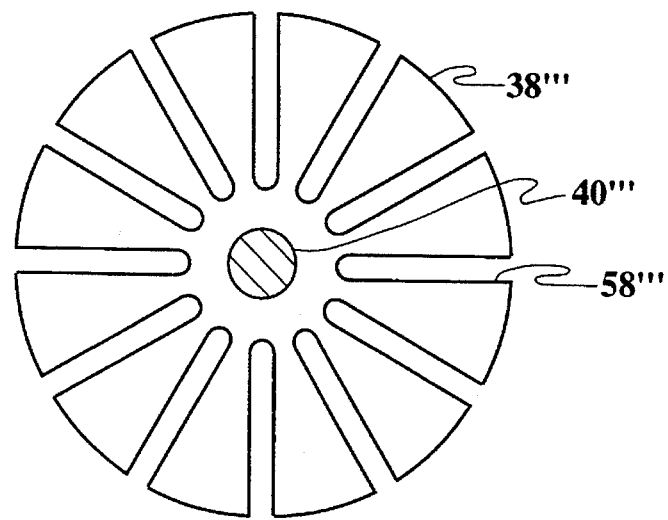
FIG. 6 is a top view of an axially slotted piston for a fluid mounting including axial damping.

FIG. 6 illustrates a piston 38'''' including radial milled slots 58'''' used on the axially acting embodiment of FIG. 5. The thickness and number of the slots 58 can be varied to optimize damping.

In summary, the present invention relates to a device for providing support and for damping vibrations. The device can be a mount or a damper and is ideally suited for use in a helicopter rotor system which uses a hingeless rotor. The present invention includes a piston substantially completely surrounded by fluid and moves within a fluid cavity in response to relative movement between an inner member and outer member. A stiffness of one of the flexible sections is substantially higher in one direction than in the other allowing large load accommodation. Further, in another aspect, viscous drag can be increased by slotting the piston. In another aspect, the piston is located at the point of maximum motion.

While the preferred embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A fluid damping device, comprising:
   (a) an inner member for interconnection to a first moving member;
   (b) an outer member for interconnection to a second moving member;
   (c) a flexible section forming a flexible interconnection between said inner member and said outer member, said flexible section exhibiting a high stiffness in a first direction which is substantially greater than a low stiffness in a second direction, said second direction being substantially perpendicular to said first direction;
   (d) a fluid cavity formed in said fluid damping device; (e) a highly viscous fluid having a kinematic viscosity greater than 10,000 centistokes contained within and substantially filling said fluid cavity, said fluid cavity having a cavity area (Ac); and
   (f) a piston interconnected to one of said inner member and said outer member and housed within said fluid cavity, said piston having a piston area ($A_p$) and a surface area ($A_s$), said piston being substantially surrounded by said highly viscous fluid, said piston moving in a first direction within said fluid cavity as a result of relative movement between said inner member and said outer member causing said highly viscous fluid to flow about said piston in said first direction and through a flow area ($A_f$), where ($A_f=A_c-A_p$), and ($A_p >> \frac{1}{2} A_c$) and causing a damping force to be exerted on said piston by said highly viscous fluid, said damping force acting substantially along said second direction, said damping force being made up of an enhanced throttling component from said highly viscous fluid flowing through said flow area ($A_f$) and a viscous drag component developed from said highly viscous fluid acting on said surface area ($A_s$).

2. A fluid damping device of claim 1 wherein said piston has a cross-section shape which is one selected from the group consisting of an oval shaped, oblong shaped, diamond shaped, hammerhead shaped, and football shaped wherein each said cross-sectional shape minimizes damping force acting on said piston in a second direction substantially perpendicular to said first direction.

3. A fluid damping device of claim 1 wherein said piston has multiple slots formed therein for substantially increasing said surface area ($A_s$) of said piston exposed to said highly viscous fluid along said second direction where said ($A_s$) is substantially greater than said ($A_p$).

4. A fluid damping device of claim 1 wherein said piston and said fluid cavity are located at a point outboard of said elastomer section where maximum relative motion occurs between said highly viscous fluid and said piston.

5. A fluid damping device of claim 1 wherein said piston is supported by a pedestal attaching to one of said inner member and said outer member.

6. A fluid damping device of claim 1 wherein a volume compensator is included to compensate for volumetric expansion of said highly viscous fluid contained within said fluid damping device, said compensator including a fluid chamber, a fluid passageway interconnected to said fluid cavity, and a slideable partition including a sliding o-ring, said compensator being statically interactive with said fluid chamber.

7. A fluid damper for a hingeless helicopter rotor system, comprising:
   (a) an inner member for interconnecting to a flexbeam of said hingeless helicopter rotor system;
   (b) an outer member for interconnecting to a torque tube of said hingeless helicopter rotor system;
   (c) a flexible section attached between said inner member and said outer member, said flexible section exhibiting an axial stiffness for reacting flap loads and a radial stiffness for reacting lead-lag loads, said axial stiffness being substantially greater than said radial stiffness;
   (d) a fluid cavity having a cavity area (Ac) formed in said fluid damper;

(e) a highly viscous fluid having a kinematic viscosity greater than 10,000 centistokes contained within and substantially filling said fluid cavity;

(f) a piston having a piston area (Ap) where (Ap>>½ Ac), said piston interconnected to one of said inner member and said outer member, said piston housed within said fluid cavity and substantially completely surrounded by said highly viscous fluid, said piston moving within said fluid cavity in a radial direction as a result of lead-lag motions within said hingeless helicopter rotor system;

whereby as a result of relative movement between said inner member and said outer member said highly viscous fluid flows about said piston and causes a damping force to be exerted on said piston by said highly viscous fluid said damping force having a viscous drag component and a throttling component.

8. A damper of claim 7 wherein said interconnection to said inner member to said flexbeam is made by a bearing capable of accommodating at least one selected from the group consisting of torsional and cocking motion.

9. A damper of claim 7 wherein said piston includes a series of slots substantially aligned with said radial direction to substantially increase a surface area (As) of said piston exposed to said highly viscous fluid in said radial direction.

10. A fluid mounting for attachment of an engine to a support structure, comprising:

(a) an inner member for interconnection to a first moving member;

(b) an outer member for interconnection to a second moving member;

(c) an elastomeric section causing a flexible connection between said inner member and said outer member, said elastomeric section including a radial stiffness and an axial stiffness, one of said axial stiffness and said radial stiffness being at least ten times greater than the other of said axial stiffness and said radial stiffness;

(d) a fluid cavity being outboard of said elastomer section and having an area ($A_c$) formed within said fluid mounting;

(e) a viscous fluid having a kinematic viscosity of at least 10,000 centistoke contained within and substantially filling said fluid cavity; and (f) a piston outboard of said elastomer section and interconnected to one of said inner member and said outer member and housed within said fluid cavity, said piston having a piston area ($A_p$), where $A_p >> ½ A_c$, and a surface area ($A_s$), said piston substantially completely surrounded by said viscous fluid, said piston moving in a first direction within said fluid cavity as a result of relative movement between said inner member and said outer member causing said viscous fluid to flow about said piston and through a flow area ($A_f$), where ($A_f = A_c - A_p$) and causing a damping force to be exerted on said piston by said viscous fluid, said damping force being made up of an enhanced throttling component from said flow through said flow area (Af) and a viscous drag component from said viscous fluid acting on said surface area (As).

11. A mounting of claim 10 wherein said fluid cavity is interconnected by a fluid passageway to a second fluid chamber of a volume compensator to provide volume compensation, said volume compensator including a slidable partition having a sliding o-ring, said slidable partition being statically interactive with said second fluid chamber.

12. A mounting of claim 10 wherein said piston includes a plurality of slots substantially aligned with a predetermined radial direction for substantially increasing said surface area (As) exposed to said fluid where said surface area (As) is substantially greater than said piston area (Ap).

13. A mounting of claim 12 wherein said slots are formed by a plurality of differing length plate members which are alternately stacked.

14. A mounting of claim 10 wherein said piston is tapered from center to edge such that a thickest portion is adjacent the center of said piston, said tapering minimizing the damping force generated by movement of said piston in a second direction perpendicular to said first direction.

* * * * *